United States Patent
Outlaw et al.

(10) Patent No.: US 7,205,895 B2
(45) Date of Patent: Apr. 17, 2007

(54) LOCATING A WIRELESS DEVICE

(75) Inventors: Michael P. Outlaw, Dallas, GA (US); Matthew B. Trevathan, Kennesaw, GA (US)

(73) Assignee: International Business Machines Corporation, Armonk, NY (US)

( * ) Notice: Subject to any disclaimer, the term of this patent is extended or adjusted under 35 U.S.C. 154(b) by 330 days.

(21) Appl. No.: 10/880,037

(22) Filed: Jun. 29, 2004

(65) Prior Publication Data

US 2005/0285731 A1   Dec. 29, 2005

(51) Int. Cl.
*G08B 13/14*   (2006.01)

(52) U.S. Cl. ................ 340/572.1; 340/571; 340/573.1; 340/573.4

(58) Field of Classification Search ........... 340/539.11, 340/539.13, 539.15, 568.1, 572.1, 572.4, 340/573.1, 573.2, 573.4; 707/104.1, 102; 40/300; 709/203

See application file for complete search history.

(56) References Cited

U.S. PATENT DOCUMENTS

| | | | | |
|---|---|---|---|---|
| 5,036,610 | A * | 8/1991 | Fehr ............................ | 40/300 |
| 5,742,666 | A | 4/1998 | Alpert ...................... | 455/404.2 |
| 6,067,018 | A * | 5/2000 | Skelton et al. ........... | 340/573.3 |
| 6,433,685 | B1 * | 8/2002 | Struble et al. .............. | 340/571 |
| 6,624,752 | B2 * | 9/2003 | Klitsgaard et al. ........ | 340/572.1 |
| 6,636,732 | B1 | 10/2003 | Boling et al. ............. | 455/404.1 |
| 6,731,939 | B1 | 5/2004 | Watanabe et al. ........... | 455/450 |
| 6,900,731 | B2 * | 5/2005 | Kreiner et al. ........... | 340/572.1 |
| 6,910,050 | B2 * | 6/2005 | Pawlick .................... | 707/104.1 |
| 2002/0072924 | A1 | 6/2002 | Gray | |
| 2002/0077123 | A1 | 6/2002 | Otsuka et al. | |
| 2002/0131330 | A1 | 9/2002 | Zion et al. | |
| 2003/0008659 | A1 | 1/2003 | Waters et al. | |
| 2003/0013491 | A1 | 1/2003 | Moriki | |
| 2003/0087627 | A1 | 5/2003 | Cannon | |
| 2003/0117316 | A1 | 6/2003 | Tischer | |

* cited by examiner

Primary Examiner—Van T. Trieu
(74) *Attorney, Agent, or Firm*—Schmeiser, Olsen & Watts; John R. Pivnichny

(57) ABSTRACT

A method for locating and contacting an owner of a lost wireless device. A first person having a first wireless device finds a lost wireless device belonging to a second person. The first wireless device and the lost wireless device each comprise a same discoverable wireless protocol. The first person enters a lost key code on the lost wireless device. The lost wireless device establishes, a connection between the lost wireless device and the first wireless device. The first person accesses data stored on the first wireless device. The first person selects specified data from the data stored on the first wireless device. The first person downloads to the lost wireless device, the specified data from the first wireless device and sends the specified data to a communication device so that the second person may retrieve the specified data through the communication device.

29 Claims, 5 Drawing Sheets

LOCATING A WIRELESS DEVICE

BACKGROUND OF THE INVENTION

1. Technical Field

The present invention relates to a method for contacting and sending data to a person that has lost or misplaced a wireless device.

2. Related Art

Locating a person that has misplaced a device is typically difficult and very time consuming. Therefore there is a need for efficiently and easily locating a person that has misplaced a device.

SUMMARY OF THE INVENTION

The present invention provides a method for locating a lost wireless device, comprising:

finding by a first person having a first wireless device, the lost wireless device belonging to a second person, wherein the first wireless device and the lost wireless device each comprise a same discoverable wireless protocol;

entering by the first person, a lost key code on the lost wireless device;

establishing by the lost wireless device in response to the lost key code, a connection between the lost wireless device and the first wireless device;

accessing by the first person, data stored on the first wireless device;

selecting by the first person, specified data from the data stored on the first wireless device;

receiving by the lost wireless device, the specified data from the first wireless device; and sending by the lost wireless device, the specified data to a communication device so that the second person can retrieve the specified data through the communication device.

The present invention provides a method for locating a lost wireless device, comprising:

finding by a first person, the lost wireless device belonging to a second person;

entering by the first person, a lost key code on the lost wireless device;

establishing by the lost wireless device in response to the lost key code, a connection between the lost wireless device and a communication device belonging to the second person; and relaying information by the first person using the lost wireless device, to the second person using the communication device.

The present invention provides a method for locating a lost wireless device, comprising:

finding by a first person, the lost wireless device belonging to a second person;

entering by the first person, a lost key code on the lost wireless device;

manually entering by the first person, personal data into the lost wireless device;

establishing by the lost wireless device, a connection between the lost wireless device and a communication device belonging to the second person;

sending by the lost wireless device, the personal data to the second person; and retrieving by the second person, the personal data through the communication device.

The present invention advantageously provides a method to efficiently and easily locate a person that has misplaced a device.

DETAILED DESCRIPTION OF THE INVENTION

Figure 1:
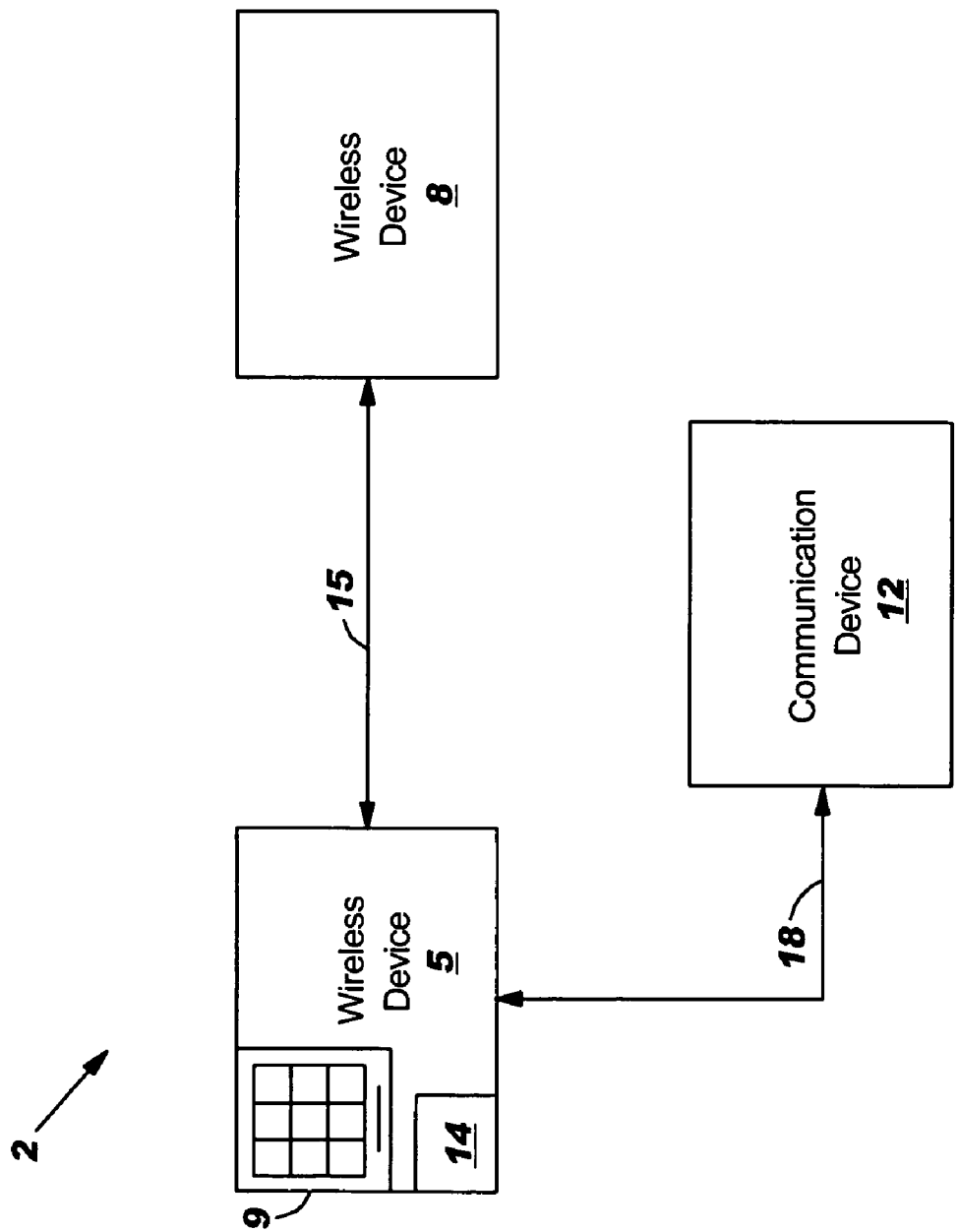
FIG. 1 illustrates a block diagram of a system for implementing a discoverable wireless protocol based method for contacting an owner of a wireless device that may have been lost or misplaced so that the owner may retrieve the wireless device, in accordance with embodiments of the present invention.

FIG. 1 illustrates a block diagram of a system 2 for implementing a discoverable wireless protocol based method for contacting an owner of a wireless device 5 that may have been lost or misplaced so that the owner may retrieve the wireless device 5, in accordance with embodiments of the present invention. The term "discoverable" wireless protocol is defined herein as a wireless protocol that allows a first wireless device (e.g., wireless device 5) to conduct a search for a second wireless device (e.g., wireless device 8) so that the first wireless device may retrieve data from the second wireless device. The discoverable wireless protocol may be any discoverable wireless protocol including, inter alia, a Bluetooth wireless protocol, a radio frequency identification (RFID) wireless protocol, an 802.11 wireless protocol, etc. The system 2 allows a first person that finds the wireless device 5 to use the wireless device 5 to send personal contact data belonging to the first person (i.e., data that enables the owner to contact the first person) to the owner of the wireless device 5 via a communication device 12 (i.e., the wireless device 5 is pre-configured to automatically connect to the communication device 12 upon a specified input through the input device 9 (e.g., send button, alpha/numeric code, etc)) also belonging to the owner so that the owner may contact the first person to retrieve his/her wireless device 5. The personal contact data belonging to the first person may include, inter alia, a telephone number, a location address (e.g., a home address), an email address, an instant messenger name, short message service (SMS) contact data, and multimedia message service (MMS) contact data, etc. The wireless device 5 may communicate with and/or pass data to/from the wireless device 8 via the link 15. Additionally, the wireless device 5 may communicate with and/or pass data to/from the communication device 12 via the link 18. The link 15 may be, inter alia, a wireless link, a wireless/hard wire combination link, etc. The link 18 may be, inter alia, a wireless link, a wireless/hard wire combination link, etc. The wireless device 5 may be any wireless device known to a person of ordinary skill in the art including, inter alia, a cellular phone (digital or analog), a personal digital assistant (PDA), a computer, a global positioning satellite (GPS) device, etc. The wireless device 8 may be any wireless device known to a person of ordinary skill in the art including, inter alia, a cellular phone (digital or analog), a PDA, a computer, a GPS device, etc. The communication device 12 may be any communication device known to a person of ordinary skill in the art including, inter alia, a cellular phone (digital or analog), a telephone, a personal digital assistant (PDA), a computer, a global positioning satellite (GPS) device, etc. The wireless device 5 comprises an input device 9. The input device 9 may be any input device known to a person of ordinary sill in the art such as, inter alia, a keyboard, a keypad, a mouse, etc. The wireless device 5 comprises an output device 14. The output device 14 may be any output device known to a person of ordinary sill in the art such as, inter alia, a monitor, etc. Alternatively, the output device 14 may be a combination input/output (I/O) device such as, inter alia, a touch screen monitor, etc. The wireless device 5 and the wireless device 8 in FIG. 1 are each discoverable wireless devices using a discoverable wireless protocol. The communication device 12 in FIG. 1 may be, inter alia, discoverable wireless device using a discoverable wireless protocol. The discoverable wireless protocol based method for contacting an owner of the wireless device 5 that may be lost or misplaced so that the owner may retrieve the wireless device 5 is described in the description of FIG. 3.

Figure 2:
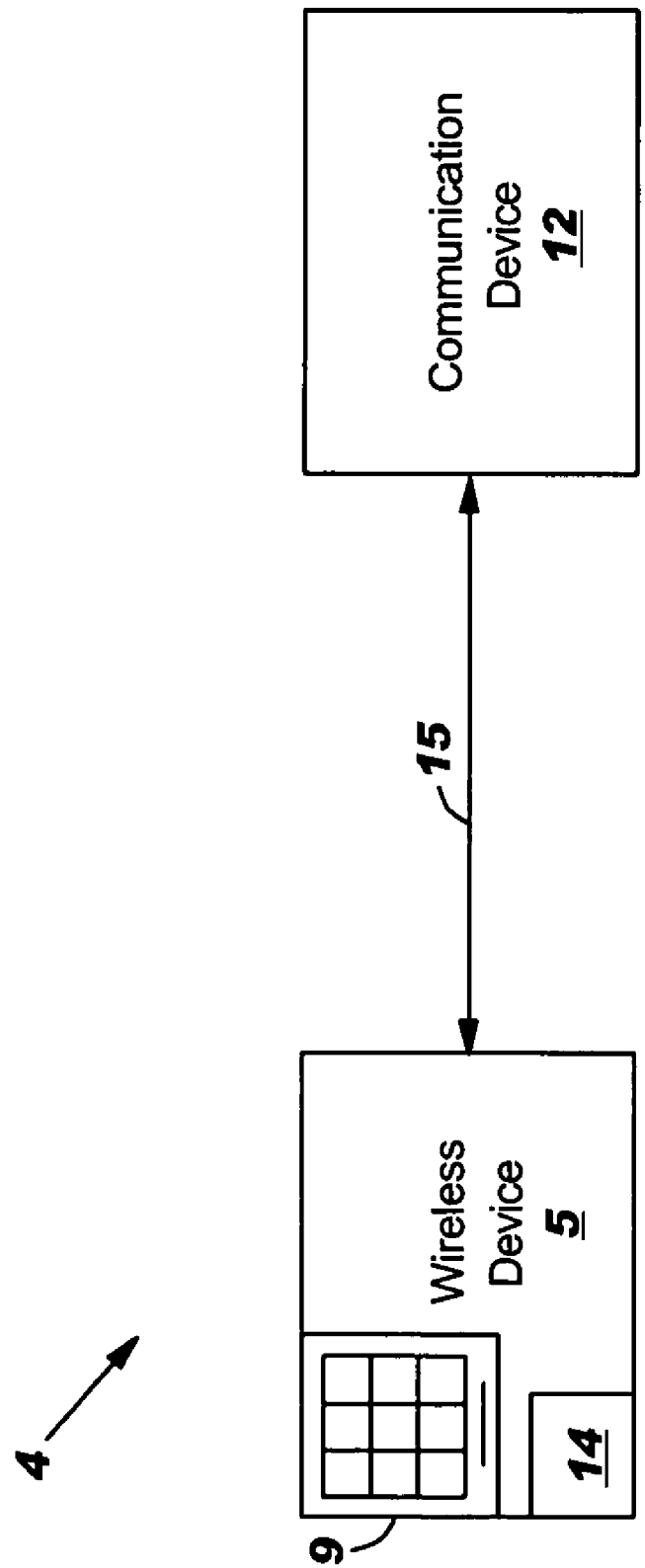
FIG. 2 illustrates an alternative to the block diagram of FIG. 1 showing a block diagram of a system for implementing a non-discoverable wireless protocol based method for contacting an owner of a wireless device that may have been lost or misplaced so that the owner may retrieve the wireless device, in accordance with embodiments of the present invention.

FIG. 2 illustrates an alternative to the block diagram of FIG. 1 showing a block diagram of a system 4 for implementing a non-discoverable wireless protocol based method for contacting an owner of a wireless device 5 that may be lost or misplaced so that the owner may retrieve the wireless device 5, in accordance with embodiments of the present invention. The system 4 allows a first person that finds the wireless device 5 to contact the owner of the wireless device 5 via the communication device 12 (i.e., the wireless device 5 is pre-configured to automatically connect to the communication device 12 upon a specified input through the input device 9 (e.g., send button, alpha/numeric code, etc)) so that the owner may retrieve his/her wireless device 5. The wireless device 5 may communicate with and/or pass data to/from the communication device 12 via the link 15. The link 15 may be, inter alia, a wireless link, a wireless/hard wire combination link, etc. The wireless device 5 comprises an input device 9. The input device 9 may be any input device known to a person of ordinary sill in the art such as, inter alia, a keyboard, a keypad, a mouse, etc. The wireless device 5 comprises an output device 14. The output device 14 may be any output device known to a person of ordinary sill in the art such as, inter alia, a monitor, etc. Alternatively, the output device 14 may be a combination input/output (I/O) device such as, inter alia, a touch screen monitor, etc. The wireless device 5 may be any wireless device known to a person of ordinary skill in the art including, inter alia, a cellular phone (digital or analog), a personal digital assistant (PDA), a computer, a global positioning satellite (GPS) device, etc. The communication device 12 may be any communication device known to a person of ordinary skill in the art including, inter alia, a cellular phone (digital or analog), a telephone, a personal digital assistant (PDA), a computer, a global positioning satellite (GPS) device, etc. The non-discoverable method for contacting the owner of the wireless device 5 that may be lost or misplaced so that the owner may retrieve the wireless device 5 comprises a first embodiment and a second embodiment as described with reference to FIGS. 4 and 5 respectively.

Figure 3:
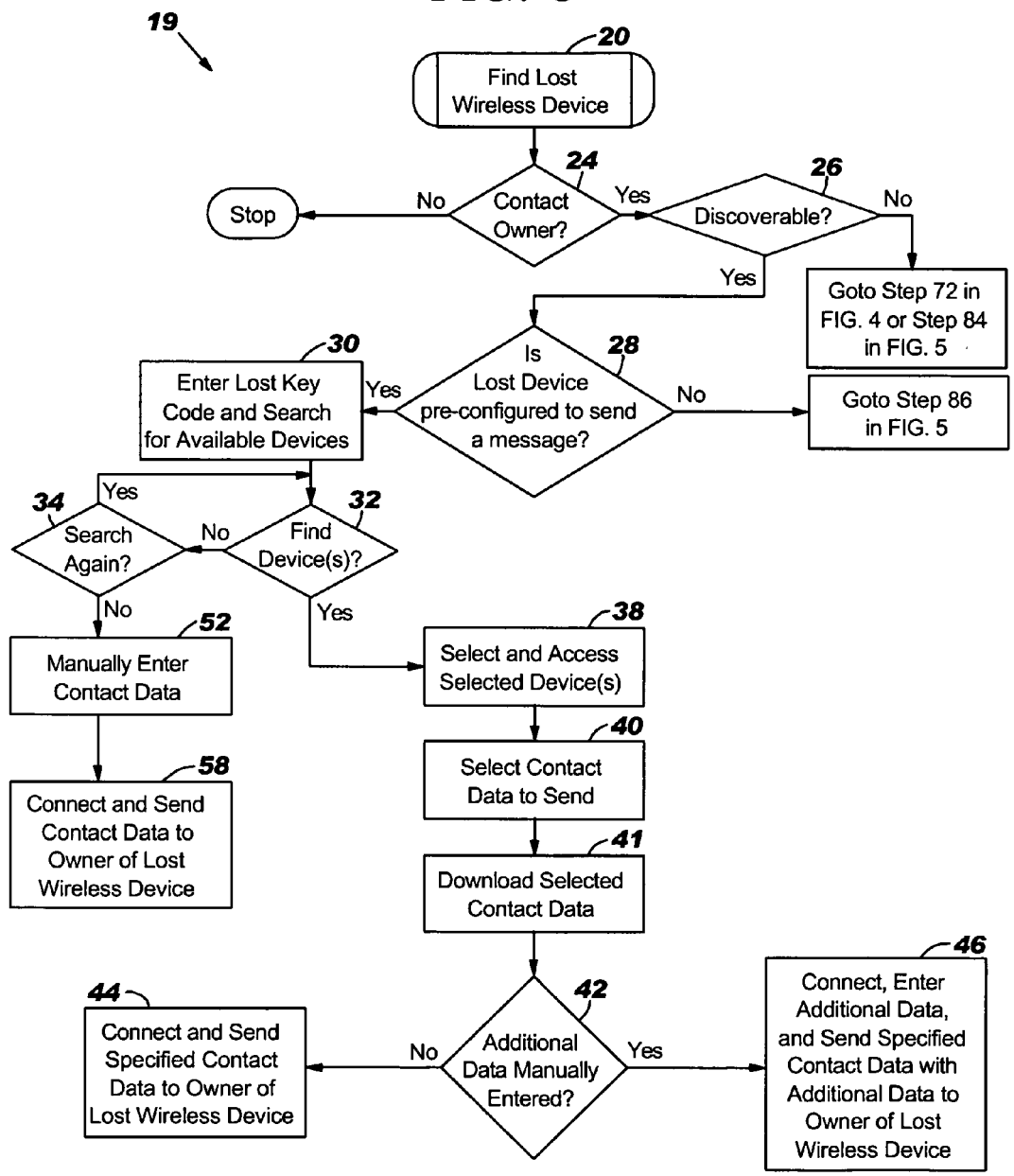
FIG. 3 is a flowchart depicting an algorithm showing an embodiment based on FIG. 1, in accordance with embodiments of the present invention.

FIG. 3 is a flowchart depicting an algorithm 19 showing an embodiment based on the system 2 of FIG. 1, in accordance with embodiments of the present invention. The algorithm 19 describes a discoverable wireless protocol method for contacting an owner of a wireless device 5 (of FIG. 1) that may be lost or misplaced so that the owner may retrieve the wireless device 5. The discoverable wireless protocol may be any discoverable wireless protocol including, inter alia, a Bluetooth wireless protocol, a radio frequency identification (RFID) wireless protocol, an 802.11 wireless protocol, etc. The method allows a first person that finds the wireless device 5 to use the wireless device 5 to send personal contact data belonging to the first person (i.e., data that enables the owner to contact the first person) to the owner of the wireless device 5 via a communication device 12 (i.e., the wireless device 5 is pre-configured to automatically connect to the communication device 12 upon a specified input through the input device 9 (e.g., send button, alpha/numeric code, etc)) also belonging to the owner so that the owner may contact the first person to retrieve his/her wireless device 5. The personal contact data belonging to the first person may include, inter alia, a telephone number, a location address, an email address, an instant messenger name, short message service (SMS) contact data, and multimedia message service (MMS) contact data, etc. The first person finding the wireless device 5 may use the wireless device 5 to retrieve the personal contact data (i.e., belonging to the first person) or a portion of the personal contact data from his/her own wireless device 8 (i.e., the personal contact data is stored on the wireless device 8 in FIG. 1) and send (using the wireless device 5) the personal contact data or a portion of the personal contact data to the owner of the wireless device 5 via the communication device 12 (i.e., the wireless device 5 is pre-configured to automatically connect to the communication device upon a specified input through the input device 9 (e.g., send button, alpha/numeric code, etc)) so that the owner may contact the first person to retrieve their wireless device 5 (i.e., the wireless device 5 downloads the personal contact data from the wireless device 8 and sends the personal contact data to the communication device 12). Alternatively or additionally, the first person may manually enter the personal contact data or additional contact data through the input device 9 in FIG. 1 for sending to the owner of the wireless device 5 via the communication device 12 (i.e., the wireless device 5 is pre-configured to automatically connect to the communication device 12 upon a specified input through the input device 9 (e.g., send button, alpha/numeric code, etc)). The following steps for the algorithm 19 describe the above mentioned method.

In step 20, a person finds the wireless device 5. In step 24, the first person decides as to whether or not to contact an owner of the wireless device 5. If the first person decides to not to contact the owner of the wireless device 5 in step 24, then stop (i.e., the algorithm 19 is terminated). If the first person decides to contact the owner of the wireless device 5 in step 24, then the first person determines if the wireless device 5 is a discoverable wireless device in step 26. The wireless device 5 may be determined to be a discoverable wireless device by any method known to a person of ordinary skill in the art including, inter alia, activating a button(s) on the input device 9 and reading a discoverable logo on the output device 14, a discoverable logo may be stamped on the wireless device 5, etc. Additionally in step 26, the first person determines if he/she owns a discoverable wireless device (i.e., wireless device 8 in FIG. 1). If it is determined that the wireless device 5 is not a discoverable wireless device in step 26, then goto step 72 in FIG. 4 or step 84 in FIG. 5. If it is determined that the wireless device 5 is a discoverable wireless device and the first person also owns a discoverable wireless device 8 in step 26, then the first person determines if the wireless device 5 is pre-configured to send a message to the owner in step 28. It maybe determined that the wireless device 5 is pre-configured to send a message to the owner by any method including, inter alia, activating a button(s) on the input device 9 and reading the a message such as inter alia, "message to owner enabled" on the output device 14, a pre-configured to send a message to owner type message may be stamped on the wireless device 5, etc. The message may be, inter alia, a text message, a voice message, a text to voice message, etc. If it is determined that the wireless device 5 is not pre-configured to send a message in step 26, then goto step 86 in FIG. 5. If it is determined that the wireless device 5 is pre-configured to send a message to the owner in step 28, then the first person will input a lost key code using the input device 9 in step 30. The lost key code will identify that the wireless device 5 is lost and will initiate a process to contact an owner of the (lost) wireless device 5. The term "lost key code" is defined herein as a universal code (e.g., at least one button on the input device) entered through the input device 9 that will identify that the wireless device 5 is lost and will initiate a process to contact an owner of the (lost) wireless device 5 (e.g., through communication device 12). The term "lost key code" by definition does not refer to a telephone number. The lost key code may comprise an alphanumeric code. Upon identification that the wireless device 5 is lost the first person will be prompted to send personal contact information to the owner of the wireless device 5 and the wireless device 5 will enable a search for available (i.e., enabled and locally accessible for discoverable transmission) discoverable device(s) belonging to the first person (i.e., wireless device 8) in step 30. If any available (i.e., enabled and locally accessible for discoverable transmission) discoverable device(s) belonging to the first person (i.e., wireless device 8) are not located in step 32 then the wireless device 5 may search again in step 34. The wireless device 5 may search for available discoverable device(s) belonging to the first person until an available discoverable device (i.e., wireless device 8) is located or until the first person terminates the search.

If any available discoverable device(s) belonging to the first person (i.e., wireless device 8) are located in step 32 then the wireless device 5 establishes a connection to the available discoverable device belonging to the first person (i.e., wireless device 8) in step 38. In the event that a plurality of available discoverable device(s) belonging to the first person are located in step 32, the first person is prompted to select (from a list displayed on the output device 14) one available discoverable device to establish a connection to in step 38. After a connection has been established between the wireless device 5 and the wireless device 8, the first person selects (e.g., in response to a command (e.g., button on keypad) entered through the input device) specified personal contact data (i.e., a portion of the personal contact data) stored on the wireless device 8 for downloading to the wireless device 5 in step 40. For example, the personal contact data stored on the wireless device 8 may comprise a telephone number and an email address for the first person. In step 40, the first person may select either the telephone number or the email address for downloading. The personal contact data may be viewed on the output device 14 (e.g., as a list) for selection of the specified contact data. The specified personal contact data is downloaded to the wireless device 5 in step 41. In step 42, the first person is given an option of manually entering additional personal contact data (i.e., entering additional personal data through the input device 9 in FIG. 1). For example, the personal contact data stored on the wireless device 8 may not comprise a telephone number so the first person may want to manually enter his/her telephone number. If the first person does not want to manually enter additional personal contact data in step 42, then the first person establishes a connection between the wireless device 5 and the communication device 12 (i.e., the wireless device 5 is pre-configured to automatically connect and send the personal contact data to the communication device 12 upon a specified input through the input device 9 (e.g., send button, alpha/numeric code, etc)) so that the specified personal contact data downloaded to the wireless device 5 in step 41 is sent to the owner of the wireless device 5 as a message through the communication device 12 in step 44. The owner of the wireless device 5 may use the personal contact data to contact the first person to retrieve their wireless device 5. If the first person does want to manually enter additional personal contact data in step 42, then the first person establishes a connection between the wireless device 5 and the communication device 12 (i.e., the wireless device 5 is pre-configured to automatically connect and send the personal contact data to the communication device 12 upon a specified input through the input device 9 (e.g., send button, alpha/numeric code, etc)) so that the specified personal contact data downloaded to the wireless device 5 in step 41 and the manually entered additional personal contact data from step 42 are sent to the owner of the wireless device 5 as a message (e.g., a text message, a voice message, a text to voice message, etc) through the communication device 12 in step 44. The owner of the wireless device 5 may use the personal contact data to contact the first person to retrieve their wireless device 5. If the owner does not have a communication device 12 or the communication device 12 is disabled in step 46 or step 44 then the specified personal contact data downloaded to the wireless device 5 in step 41 and/or the manually entered additional personal contact data from step 42 data may not be sent to the owner of the lost wireless device 5.

If any available discoverable device(s) belonging to the first person (i.e., wireless device 8) are not located in step 32 and the first person does not choose to search again in step 34, then the first person may choose to manually enter personal contact data (i.e., entering additional personal data through the input device 9 in FIG. 1) in step 52. In step 58 the first person establishes a connection between the wireless device 5 and the communication device 12 (i.e., the wireless device 5 is pre-configured to automatically connect and send the personal contact data to the communication device 12 upon a specified input through the input device 9 (e.g., send button, alpha/numeric code, etc)) so that the manually entered personal contact data from step 52 may be sent to the owner of the wireless device 5 as a message (e.g., a text message, a voice message, a text to voice message, etc) through the communication device 12. The owner of the wireless device 5 may use the personal contact data to contact the first person to retrieve their wireless device 5. If the owner does not have a communication device 12 or the communication device 12 is disabled in step 58 then the manually entered contact data from step 52 data may not be sent to the owner of the lost wireless device 5.

Figure 4:
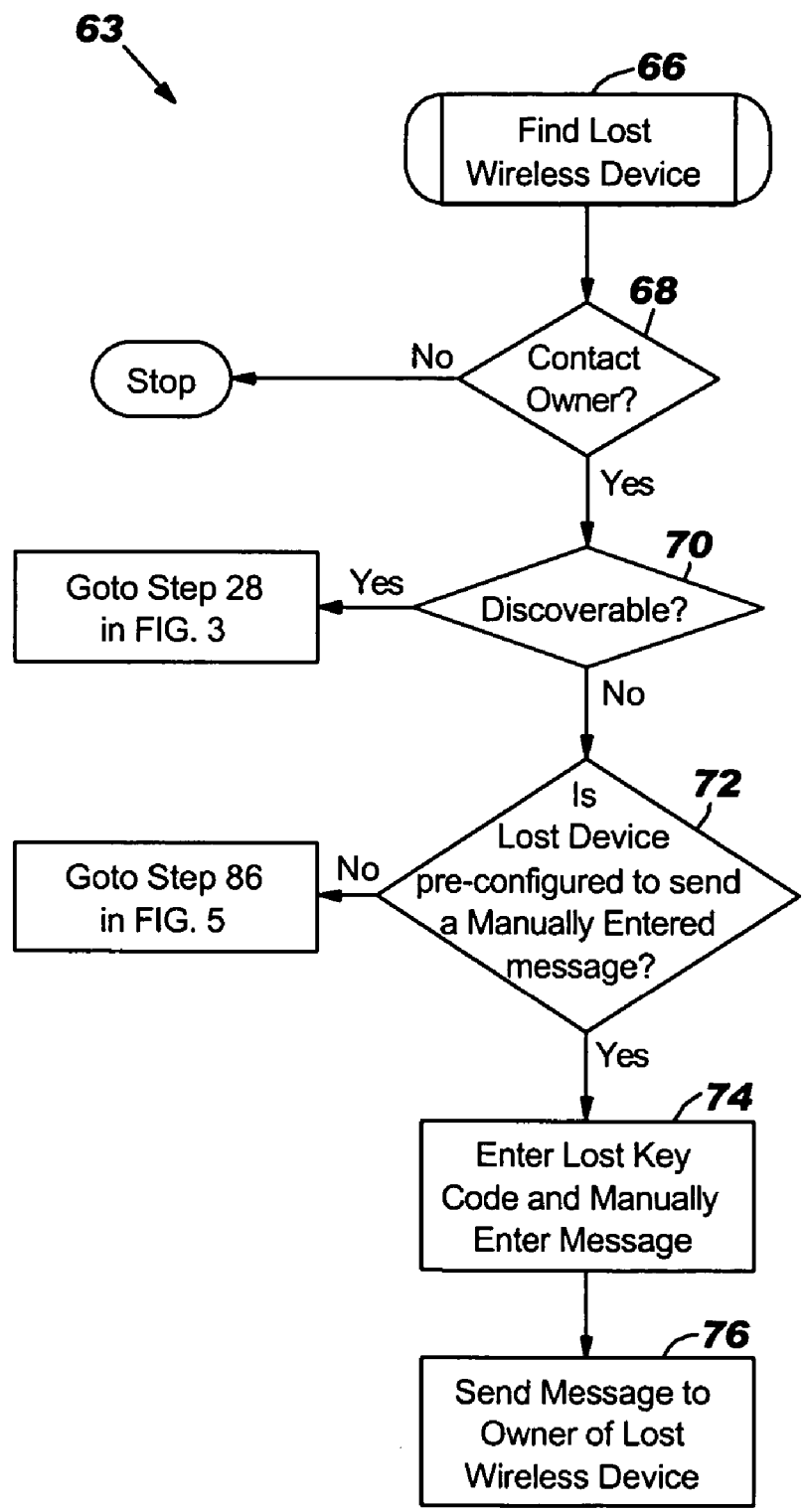
FIG. 4 is a flowchart depicting an algorithm showing a first embodiment based on the FIG. 2, in accordance with embodiments of the present invention.

FIG. 4 is a flowchart depicting an algorithm 63 showing a first embodiment based on the system 4 of FIG. 2, in accordance with embodiments of the present invention. The algorithm 63 describes a non-discoverable wireless protocol method for contacting an owner of a wireless device 5 (of FIG. 2) that may be lost or misplaced so that the owner may retrieve the wireless device 5. The method allows a first person that finds the wireless device 5 to use the wireless device 5 to send personal contact data belonging to the first person (i.e., data that enables the owner to contact the first person) to the owner of the wireless device 5 via a communication device 12 also belonging to the owner so that the owner may contact the first person to retrieve his/her wireless device 5. The personal contact data belonging to the first person may include, inter alia, a telephone number, a location address, an email address, an instant messenger name, short message service (SMS) contact data, and multimedia message service (MMS) contact data, etc. The first person will manually enter the personal contact data into the wireless device 5 and use the wireless device 5 to send the personal contact data to the owner via the communication device 12. The following steps for the algorithm 63 describe the above mentioned method.

In step 66, a first person finds the wireless device 5. In step 68, the first person will decide as to whether or not to contact an owner of the wireless device 5. If the first person decides to not to contact the owner of the wireless device 5 in step 68, then stop (i.e., the algorithm 63 is terminated). If the first person decides to contact the owner of the wireless device 5 in step 68, then the first person determines if the wireless device 5 is a discoverable wireless device in step 70. Determining whether the wireless device 5 is a discoverable wireless device may be accomplished by any method known to a person of ordinary skill in the art including, inter alia, activating a button(s) on the input device 9 and reading a wireless protocol message on the output device 14, etc. If it is determined that the wireless device 5 is a discoverable wireless device in step 70, then goto step 28 in FIG. 3. If it is determined that the wireless device 5 is not a discoverable wireless device in step 70, then the first person determines if the wireless device 5 is pre-configured to send a message in step 72. The message may be any type of message including, inter alia, a text message, a voice message, a text to voice message, etc. It may be determined that the wireless device 5 is pre-configured to send a message by any method including, inter alia, activating a button(s) on the input device 9 and reading the a message such as inter alia, "message enabled" on the output device 14, a pre-configured to send a message type message may be stamped on the wireless device 5, etc. If it is determined that the wireless device 5 is not pre-configured to send a manually entered message in step 72, then goto step 86 in FIG. 5. If it is determined that the wireless device 5 is pre-configured to send a message in step 72, then the first person will input a lost key code using the input device 9 in step 74. The lost key code will identify that the wireless device 5 is lost. Upon identification that the wireless device 5 is lost the first person will be prompted to manually enter his/her personal contact information into the wireless device 5 in step 74 (i.e., entering personal data through the input device 9 in FIG. 1) in step 74. In step 76 the first person establishes a connection between the wireless device 5 and the communication device 12 (i.e., the wireless device 5 is pre-configured to automatically connect and send the personal contact data to the communication device 12 upon a specified input through the input device 9 (e.g., send button, alpha/numeric code, etc)) so that the manually entered personal contact data from step 74 may be sent to the owner of the wireless device 5 as a message(e.g., a text message, a voice message, a text to voice message, etc) through the communication device 12. The owner of the wireless device 5 may use the personal contact data to contact the first person to retrieve their wireless device 5. If the owner of the lost wireless device 5 does not have a communication device 12 or the communication device 12 is disabled in step 76 then the manually entered contact data from step 72 may not be sent to the owner of the lost wireless device 5.

Figure 5:
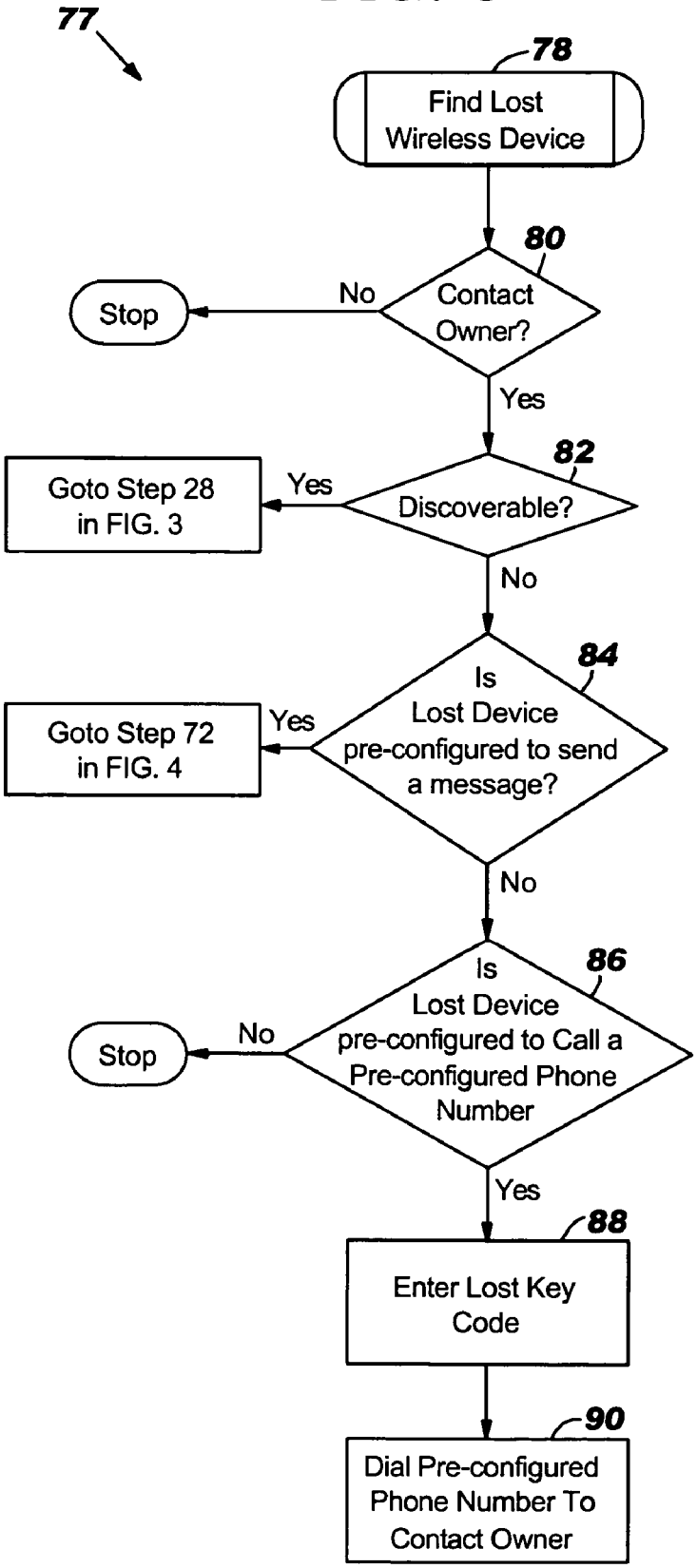
FIG. 5 is a flowchart depicting an algorithm showing a second embodiment based on of FIG. 2, in accordance with embodiments of the present invention.

FIG. 5 is a flowchart depicting an algorithm 77 showing a second embodiment based on the system 4 of FIG. 2, in accordance with embodiments of the present invention. The algorithm 77 describes a second non-discoverable method for contacting an owner of a wireless device 5 (of FIG. 2) that may be lost or misplaced so that the owner may retrieve the wireless device 5. The method allows a first person finding the wireless device 5 to use the wireless device 5 to automatically call a pre-configured phone number to contact an owner of the lost wireless device 5. The pre-configured phone number is stored in the wireless device 5. In step 78, the first person finds the wireless device 5. In step 80, the first person will decide as to whether or not to contact an owner of the wireless device 5. If the first person decides to not to contact the owner of the wireless device 5 in step 80, then stop (i.e., the algorithm 77 is terminated). If the first person decides to contact the owner of the wireless device 5 in step 80, then the first person must determine if the wireless device 5 is a discoverable wireless device in step 82. Determining whether the wireless device 5 is a discoverable wireless device may be accomplished by any method known to a person of ordinary skill in the art including, inter alia, activating a button(s) on the input device 9 and reading a wireless protocol message on the output device 14, etc. If it is determined that the wireless device 5 is a discoverable wireless device in step 82, then goto step 28 in FIG. 3. If it is determined that the wireless device 5 is not a discoverable wireless device in step 82, then the first person must determine if the wireless device 5 is pre-configured to send a message in step 84. The message may be any type of message including, inter alia, a text message, a voice message, a text to voice message, etc. It may be determined whether or not the wireless device 5 is pre-configured to send a message (e.g., a text message, a voice message, a text to voice message, etc) by any method including, inter alia, activating a button(s) on the input device 9 and reading the a message such as inter alia, "text message enabled" on the output device 14, a pre-configured to send a message type message may be stamped on the wireless device 5, etc. If it is determined that the wireless device 5 is pre-configured to send a message in step 84, then goto step 72 in FIG. 4. If it is determined that the wireless device 5 is not pre-configured to send a message in step 84, then the then the first person must determine if the wireless device 5 is pre-configured to automatically dial a pre-configured telephone number in response to a lost key code in step 86. It may be determined whether or not the wireless device 5 is pre-configured to automatically dial a pre-configured telephone number by any method including, inter alia, activating a button(s) on the input device 9 and reading a message the output device 14, etc. If it is determined that the wireless device 5 is not pre-configured to dial a pre-configured telephone number in step 86, then stop (i.e., the algorithm 77 is terminated). If it is determined that the wireless device 5 is pre-configured to dial a pre-configured telephone number in step 86, then the first person will input a lost key code using the input device 9 on the wireless device 5 enabling the wireless device 5 to dial a pre-configured telephone number thereby providing a connection to the communication device 12 in FIG. 2 so that the first person may contact the owner of the lost wireless device 5 in step 90. The lost key code may, inter alia, comprise an alphanumeric code. If the owner of the lost wireless device 5 does not have a communication device 12 or the communication device 12 is disabled in step 90 then the wireless device 5 may not dial a pre-configured telephone number to provide a connection to the communication device 12.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method for locating a lost wireless device, comprising:
   finding by a first person having a first wireless device, the lost wireless device belonging to a second person, wherein the first wireless device and the lost wireless device each comprise a same discoverable wireless protocol, and wherein the lost wireless device comprises an input device;
   entering by the first person, a lost key code on the input device comprised by the lost wireless device;
   establishing by the lost wireless device in response to the lost key code, a connection between the lost wireless device and the first wireless device;
   accessing by the first person, data stored on the first wireless device;
   selecting by the first person, specified data from the data stored on the first wireless device;
   receiving by the lost wireless device, the specified data from the first wireless device; and
   sending by the lost wireless device, the specified data to a communication device so that the second person can retrieve the specified data through the communication device.

2. The method of claim 1, wherein the discoverable wireless protocol is selected from the group consisting of a Bluetooth wireless protocol, a radio frequency identification (RFID) wireless protocol, and an 802.11 wireless protocol.

3. The method of claim 1, wherein the first wireless device is selected from the group consisting of a cellular phone, a cordless telephone, a personal digital assistant (PDA), a computer, and a global positioning satellite (GPS) device.

4. The method of claim 1, wherein the lost wireless device is selected from the group consisting of a cellular phone, PDA, a computer, and a GPS device.

5. The method of claim 1, wherein the specified data comprises information selected from the group consisting of a telephone number, a location address, an email address, an instant messenger name, short message service (SMS) contact information, and multimedia message service (MMS) contact information.

6. The method of claim 1, wherein said entering comprises enabling at least one switch on the lost wireless device.

7. The method of claim 1, wherein the last key code comprises an alpha/numeric code.

8. The method of claim 1, further comprising:
   manually entering by the first person, additional data into input device comprised by the lost wireless device; and
   sending by the lost wireless device, the additional data to the second person to a communication device so that the second person can retrieve the additional data through the communication device.

9. The method claim 8, wherein the additional data comprises information selected from the group consisting of a telephone number, a location address, an email address, an instant messenger name, short message service (SMS) contact information, and multimedia message service (MMS) contact information.

10. The method of claim 8, wherein the additional data comprises additional personal contact information for contacting the first person.

11. The method of claim 1, wherein said specified data comprises personal information related to said first person.

12. The method of claim 11, wherein said personal information comprises contact information for contacting said first person.

13. The method of claim 12, further comprising:
   receiving, by said first person, contact from said second person; and
   communicating, by said first person to said second person, information related to retrieving said lost wireless device.

14. A method for locating a lost wireless device, comprising:
   finding by a first person, the lost wireless device belonging to a second person, wherein the lost wireless device comprises an input device;
   entering by the first person, a lost key code on the input device comprised by the lost wireless device;
   establishing by the lost wireless device in response to the lost key code, a connection between the lost wireless device and a communication device belonging to the second person; and
   relaying information by the first person using the lost wireless device, to the second person using the communication device.

15. The method of claim 14, wherein said establishing comprises automatically dialing a pre-configured telephone number for the communication device.

16. The method of claim 14, wherein the lost wireless device is selected from the group consisting of a cellular phone, a telephone, a personal digital assistant (PDA), a computer, and a global positioning satellite (GPS) device.

17. The method of claim 14, wherein the communication device is selected from the group consisting of a cellular phone, a telephone, PDA, a computer, and a GPS device.

18. The method of claim 14, wherein the information is selected from the group consisting of a telephone number, a location address, an email address, an instant messenger name, short message service (SMS) contact information, and multimedia message service (MMS) contact information.

19. The method of claim 14, wherein said entering comprises enabling at least one switch on the lost wireless device.

20. The method of claim 14, wherein the lost key code comprises an alpha/numeric code.

21. The method of claim 14, wherein said information comprises personal information related to said first person.

22. The method of claim 21, wherein said personal information comprises contact information for contacting said first person.

23. The method of claim 22, further comprising:
   receiving, by said first person, contact from said second person; and
   communicating, by said first person to said second person, information related to retrieving said lost wireless device.

24. A method for locating a lost wireless device, comprising:
  finding by a first person, the lost wireless device belonging to a second person, wherein the lost wireless device comprises an input device;
  entering by the first person, a lost key code on the input device comprised by the lost wireless device;
  manually entering by the first person, personal data into the lost wireless device;
  establishing by the lost wireless device, a connection between the lost wireless device and a communication device belonging to the second person;
  sending by the lost wireless device, the personal data to the second person; and
  retrieving by the second person, the personal data through the communication device.

25. The method of claim 24, wherein the lost wireless device is selected from the group consisting of a cellular phone, a telephone, PDA, a computer, and a GPS device.

26. The method of claim 24, wherein the personal data comprises information selected from the group consisting of a telephone number, a location address, an email address, an instant messenger name, short message service (SMS) contact information, and multimedia message service (MMS) contact information.

27. The method of claim 24, wherein said entering comprises enabling at least one switch on the lost wireless device.

28. The method of claim 24, wherein said personal data comprises contact information for contacting said first person.

29. The method of claim 28, further comprising:
  receiving, by said first person, contact from said second person; and
  communicating, by said first person to said second person, information related to retrieving said lost wireless device.

* * * * *